United States Patent
Davis et al.

(10) Patent No.: US 11,899,908 B2
(45) Date of Patent: *Feb. 13, 2024

(54) IMAGE TEMPLATE-BASED AR FORM EXPERIENCES

(71) Applicant: INTUIT INC., Mountain View, CA (US)

(72) Inventors: Molly Beth Davis, San Francisco, CA (US); Timothy Joseph Mueller, San Diego, CA (US); Mark Anders Holmberg, Mountain View, CA (US); Jessica Jaiyeon Cho, Burbank, CA (US); Anoop Pratap Singh Tomar, Fremont, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,231

(22) Filed: Sep. 26, 2022

(65) Prior Publication Data
US 2023/0012805 A1    Jan. 19, 2023

Related U.S. Application Data

(63) Continuation of application No. 16/178,482, filed on Nov. 1, 2018, now Pat. No. 11,494,051.

(51) Int. Cl.
*G06V 20/20* (2022.01)
*G06V 30/418* (2022.01)
(Continued)

(52) U.S. Cl.
CPC ........ *G06F 3/0482* (2013.01); *G06F 3/04886* (2013.01); *G06F 40/186* (2020.01); *G06V 20/20* (2022.01); *G06V 30/418* (2022.01)

(58) Field of Classification Search
CPC .. G06F 3/0482; G06F 3/04886; G06F 40/186; G06F 3/04815; G06F 40/174; G06V 20/20; G06V 30/418
See application file for complete search history.

(56) References Cited

U.S. PATENT DOCUMENTS 9,805,511 B2   10/2017   Hintermeister et al.
10,032,225 B1   7/2018   Fox et al.
(Continued)

*Primary Examiner* — Jennifer N Welch
*Assistant Examiner* — Kuang F Chen
(74) *Attorney, Agent, or Firm* — Patterson + Sheridan, LLP

(57) ABSTRACT

Certain aspects of the present disclosure provide techniques for providing an augmented reality user interface, including: receiving, by an image sensor of an electronic device, an image of a physical document; determining a document type associated with the physical document by performing image recognition on the image of the physical document; determining an augmented reality template to display on a display of the electronic device; displaying the augmented reality template on the display of the electronic device, wherein the augmented reality template is aligned in three dimensions with the physical document; determining a distance between the physical document and the electronic device; and enabling one or more interactive user interface elements within the augmented reality template displayed on the display of the electronic device if the determined distance between the physical document and the electronic device is less than a threshold distance.

20 Claims, 5 Drawing Sheets

(51) Int. Cl.
   *G06F 3/0482*     (2013.01)
   *G06F 3/04886*    (2022.01)
   *G06F 40/186*     (2020.01)

(56) References Cited

U.S. PATENT DOCUMENTS

| | | |
|---|---|---|
| 2011/0301982 A1 | 12/2011 | Green, Jr. et al. |
| 2013/0093759 A1 | 4/2013 | Bailey |
| 2013/0160138 A1 | 6/2013 | Schultz et al. |
| 2014/0006980 A1 | 1/2014 | Belisario et al. |
| 2014/0188756 A1 | 7/2014 | Ponnavaikko et al. |
| 2015/0200922 A1 | 7/2015 | Eschbach et al. |
| 2016/0049010 A1* | 2/2016 | Hinski .................. H04N 23/80 345/633 |
| 2017/0358141 A1 | 12/2017 | Stafford et al. |
| 2019/0180154 A1 | 6/2019 | Orlov et al. |
| 2019/0340428 A1* | 11/2019 | Wickett ............... H04L 51/224 |
| 2020/0058169 A1 | 2/2020 | Friesenhahn et al. |
| 2020/0104585 A1* | 4/2020 | Collinson ............... G06F 16/34 |
| 2020/0258278 A1 | 8/2020 | Mirhosseini et al. |
| 2020/0285383 A1 | 9/2020 | Giusti et al. |
| 2020/0293177 A1* | 9/2020 | Iglesias ................ G06F 3/0487 |

\* cited by examiner

IMAGE TEMPLATE-BASED AR FORM EXPERIENCES

CROSS-REFERENCE TO RELATED APPLICATIONS

This Application is a continuation of U.S. Pat. No. 11,494,051, filed Nov. 1, 2018, the contents of which are incorporated herein by reference in their entirety.

INTRODUCTION

Aspects of the present disclosure relate to methods and systems for leveraging augmented reality systems to improve user experience with physical documents.

Despite the ongoing move towards digital everything, people still have a frequent need to deal with physical documents. For example, every year most working people will receive a physical W2 form, K1 form, 1099 form, or the like from some employer. Further, various types of organization will continue to require physical documents, such as physical documents with "wet" signatures" for financial transactions, or physical tax documents for legal compliance.

Conventional efforts to improve users' experience with physical documents have been multifaceted. For example, document providers have attempted to improve the design and consistency of documents to help understandability. As another example, more resources are provided to help explain documents, such as online text and video-based "help" or "FAQ" type resources. As yet another example, many organizations provide dedicated support personnel and systems to support users as they work with physical documents.

Unfortunately, conventional efforts have only gone so far to improve users' experiences when interacting with physical documents, and many understandability and usability issues remain. Accordingly, systems and methods are needed to improve users' experience when dealing with physical documents.

BRIEF SUMMARY

Certain embodiments provide a method of providing an augmented reality user interface, the method including: receiving, by an image sensor of an electronic device, an image of a physical document; determining a document type associated with the physical document by performing image recognition on the image of the physical document; determining an augmented reality template to display on a display of the electronic device; displaying the augmented reality template on the display of the electronic device, wherein the augmented reality template is aligned in three dimensions with the physical document; determining a distance between the physical document and the electronic device; and enabling one or more interactive user interface elements within the augmented reality template displayed on the display of the electronic device if the determined distance between the physical document and the electronic device is less than a threshold distance.

Other embodiments provide a non-transitory computer-readable medium comprising instructions to perform the method of providing an augmented reality user interface. Further embodiments provide an apparatus configured to perform the method of providing an augmented reality user interface.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

DETAILED DESCRIPTION

Figure 1:
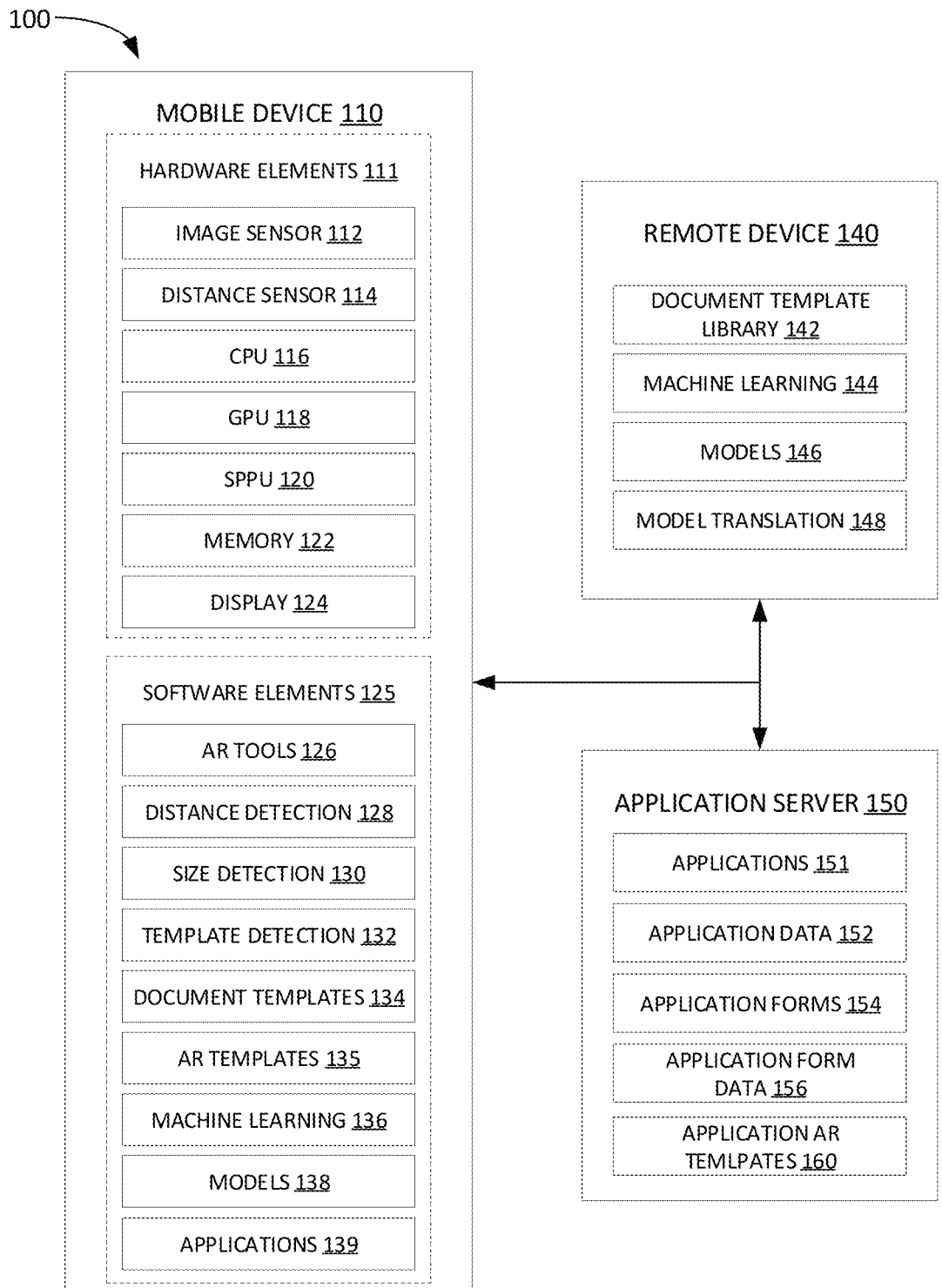
FIG. 1 depicts an example system for providing an augmented reality (AR)-based user interface to improve a user's interaction with a physical document.

Aspects of the present disclosure provide apparatuses, methods, processing systems, and computer readable mediums for providing an augmented reality user interface to improve a user's interaction with a physical document, such as a form.

Users' experience with physical documents can be vastly improved by the application of emerging technologies, such as augmented reality. Generally speaking, augmented reality (AR) is technology that provides an interactive experience whereby objects that reside in a real-world environment are "augmented" by computer-generated perceptual information, sometimes across multiple sensory modalities, including visual, auditory, haptic, somatosensory, and others. The overlaid sensory information can be constructive (i.e. additive to the real-world environment) or destructive (i.e. masking of the real-world environment). The advent of ever more powerful mobile devices, especially those with powerful image sensing hardware (e.g., cameras) and image processing software, has made AR usable in many new contexts.

One example of a context for which AR may significantly improve users' experiences is that of tax preparation. Tax documents (e.g., forms) are notoriously difficult to understand, and this problem is exacerbated by the differing nature of those tax documents across different organizations. For example, a W2 from one employer may look different and even record different information than a W2 form from another organization. Because of the inherent complexity of such documents, and some might say poor design, it is difficult to understand and extract the necessary meaning from such documents, and even harder still to discover mistakes or other issues with such documents. Further, because tax laws change frequently, any gained familiarity with one version a tax document may be wiped out with a new revision of the form.

Document type and/or template matching, e.g., through image analysis, paired with AR provides a powerful and flexible solution to improving users' experiences with physical documents. For example, image-based document type or template matching enables an appropriate AR template (e.g., overlay) to be selected automatically for any known document type or template associated with a document type.

AR templates, like document templates, may define the location and type of information on an augmented reality object, including text locations and locations of text boxes, lines, graphics, and other structures. The augmented reality object may be, for example, an overlay, virtual document, or other object that may be positioned in an augmented reality space to interact with a physical document. Thus, the AR templates themselves enable a way to dynamically provide information, interactivity, and context to a user interacting with the physical document without, for example, the need for the document to actually recite such information, or for the user to perform research or seek support (e.g., with a customer support agent) regarding the document. Moreover, this technical solution is efficient because both primary functions (image analysis and augmented reality) leverage similar hardware in modern mobile devices (e.g., image sensors and image processing software).

Example System for Providing AR Based User Interface to Improve Interaction with a Physical Document FIG. 1 depicts an example system 100 for providing an augmented reality (AR)-based user interface to improve a user's interaction with a physical document.

System 100 includes mobile device 110, which may be any sort of electronic device with an image sensor and display. In some examples, mobile device 110 may be a smartphone, tablet computer, laptop computer, smart wearable device (e.g., smart glasses), or other types of mobile electronic devices.

Mobile device 110 includes several hardware elements, including one or more image sensors 112. For example, image sensor 112 may include a camera sensor (or multiple camera sensors in some implementations). In some cases, image sensor 112 may be an entire image capture module integral with mobile device 110.

Mobile device 110 also includes one or more distance (or depth) sensors 114. For example, in some examples, distance sensors 114 may include a spot distance sensor, such as a laser or other light-based distance sensor, to perform distance estimation. In other examples, distance sensors may include a structured light sensor that emits a structured light pattern (e.g., dot pattern) to perform distance estimation. In the structured light implementation, a light emitter, such as an infrared or laser emitter, sends out a pattern of dots and the distance sensor reads the deformed pattern as it shows up reflected off surfaces to estimate distance.

Notably, in some implementations, one or more image sensors may act as a distance sensor, such as when a mobile device has two offset image sensors that may use parallax between the sensors to estimate distance.

In yet other examples, distance sensors 114 may include sound-wave based sensors, such as ultrasonic distance sensors.

Mobile device 110 also includes one or more central processing units (CPUs) 116 that carry out the instructions of a computer program by performing the basic arithmetic, logical, control and input/output (I/O) operations specified by the instructions.

Mobile device 110 also includes one or more graphics processing units (GPU) 118 that are specialized to rapidly create images in a frame buffer intended for output to a display device. GPUs may be preferable for some processing tasks, such as dealing with image data, because their highly parallel structure can make them more efficient than general-purpose CPUs for algorithms where the processing of large amount of image data can be done in parallel.

Mobile device 110 also includes one or more other special purpose processing units (SPPU) 120. A GPU is one example of a SPPU in that it is a processor specially configured for the purpose of image data processing. Similarly, other types of SPPUs may be specially configured for other types of data processing, such as machine learning and model estimation, just two name a few examples.

Mobile device 110 also includes memory 122. In some examples, memory 122 may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid state discs, or any other suitable electronic data storage mediums. Memory 122 may include working memory as well as long term storage memory. For example, memory 122 may store application files, software routines, and the like. Similarly, memory 122 may store application data.

Mobile device 110 also includes display 124. Display 124 may be any sort of display that can create images visible to a user. For example, display 124 may be an LCD-type display, OLED-type display, or other types of display technologies now known and later developed.

Display 124 may be used to display augmented reality data, such as template overlays, to a user, such as described in more detail with respect to FIGS. 2A-2F and 3, below.

Mobile device 110 also includes software elements 125, including AR tools 126. AR tools 126 may include toolkits, development environments, or other application programming interfaces (APIs) that allow applications to leverage hardware on the mobile device, such as image sensors 112, distance sensors 114, CPU 116, GPU, 118, and others to provide AR-based user interfaces. In some examples, AR tools 126 may be provided by an operating system provider for an operating system on mobile device 110, while in other examples AR tools 126 may be a third-party provider.

Mobile device 110 also includes distance detection module 128, which may include software, routines, algorithms, and other processing instructions for performing distance detection using any of hardware elements 111.

Mobile device 110 also includes size detection module 130, which may include software, routines, algorithms, and other processing instructions for performing size detection, e.g., of an object in an image captured by any of hardware elements 111, such as image sensors 112.

Mobile device 110 also includes template detection module 132, which may include software, routines, algorithms, and other processing instructions for performing detection of a template associated with a document in an image captured by any of hardware elements 111, such as image sensor 112. For example, the document template may define the location and type of information on a physical document, including text locations and locations of text boxes, lines, graphics, and other document structures.

Notably, in some cases it may not be enough to simply identify a document type, because a single document type may nevertheless have many variations in size, specification information on the document, etc. For example, W2 documents from different organizations may have many physical differences. In order for an AR template to precisely match a document identified in an augmented reality environment, a matching document template may need to be identified first. However, in cases where documents of a certain type do not vary, classification of a document type may be used as an alternative to document template detection.

Mobile device 110 also includes one or more stored document templates 134. For example, document templates 134 may relate to different types of documents (e.g., tax forms) that may be identified by template detection module 132. In some examples, templates 134 may be provided by an application developer, such as from a collection of document templates 158 associated with a particular application. Document templates 134 may be stored, for example, in memory 122.

Notably, a document template being associated with an application does not mean that the document template is unique to the application. For example, a document template related to a tax form may be used by an application developer, but may actually be based on a document (e.g., a tax form) provided by a third party.

Mobile device 110 also includes one or more AR templates 135. AR templates may be associated with a document template in order that a specific informational design (e.g., an overlay) may be displayed in an augmented reality environment to improve a user's interaction with a physical document (e.g., a tax document).

Mobile device 110 also includes machine learning module 136, which may include software, routines, algorithms, and other processing instructions for performing machine learning on mobile device 110. For example, machine learning module 136 may train machine learning models for use with distance detection module 128, size detection module 130, template detection module 132, and others. In some implementations, machine learning module 136 may leverage specific processing units in mobile device 110, such as GPU 118 and/or SPPU 120 in order to perform machine learning functions more efficiently. For example, machine learning tasks may be parallelized in order to improve performance, especially in a mobile device context.

Mobile device 110 also includes models 138, which may include machine learning models. In some cases, models 138 may include models created by mobile device 110, such as by machine learning module 136, while in other cases, models 138 may include machine learning models created by remote devices (e.g., remote device 140) and shared with mobile device 110. In some cases, mobile device 110 may receive a third party model (e.g., one of models 146 from remote device 140) and further train or otherwise improve the model using its own machine learning module 136.

In one example, one model of models 138 may be a model for predicting a document type based on an image received by image sensor 112. The document classification model may be initially trained by machine learning module 136, or refined by machine learning module 136 after having received a base document classification model from, for example, remote device 140.

Mobile device 110 also includes application 139. Applications 139 may use other software elements 125, such as described above, to improve the user experience. For example, as described below with respect to FIGS. 2A-2F, applications may use AR templates to improve a user's experience while interacting with a physical document.

Some of applications 139 may run natively on mobile device 110 without interaction with external servers or services, while other applications 139 may run in a client-server arrangement, such as in a web-based application.

Remote device 140 may be any sort of remote processing unit, such as a server, desktop computer, or other mobile device with processing capabilities. In this example, remote device 140 is configured for training models that may be used by, for example, mobile device 110.

Remote device 140 includes a document template library 142, which includes templates associated with documents that a user may interact with. For example, document template library 142 may include templates for all known tax forms. Generally speaking, a document template may take the form of a structured description of a physical document, which includes the location of text labels, text boxes (e.g., for entry of text), images, and other content found on physical documents. The structured description of the physical document may also include metadata, such as meanings associated with text labels and data types or formats for text entry boxes, just to name a few examples.

Remote device 140 also includes a machine learning module 144. Like machine learning module 136 on mobile device 110, machine learning module 144 may include software, routines, algorithms, and other processing instructions for performing machine learning on remote device 140. For example, machine learning module 144 may train machine learning models usable by modules of mobile device 110. Further, machine learning module 144 may train models for predicting document types based on document templates saved in document template library 142. For example, the document templates stored in document template library 142 may be used as training data for machine learning module 144 to create models 146 for classifying document types based on images received by mobile device 110.

In some examples, mobile device 110 may provide an image captured by image sensor 110 to remote device to classify a document within the image. This may happen if mobile device 110 does not have a document classification model, or if mobile device's document classification model is unable to classify the document. In this way, mobile device 110 is able to act autonomously initially, but to also rely on other processing systems, such as remote device 140. This may be particularly useful where remote device 140 is a powerful, purpose-built processing machine for analyzing data provided by client devices, such as mobile device 110.

Remote device 140 also includes model translation module 148. In some cases, a model created by remote device 140, e.g., via machine learning module 144, or a model otherwise stored by remote device 140, e.g., as one of models 146, may need to be translated to a format suitable for another device (e.g., mobile device 110) to use the model. For example, APPLE®'s "CoreML" allows integration of trained machine learning models into applications that run on APPLE® mobile devices. Similarly, GOOGLE®'s "ML Kit" allows similar integration of externally trained machine learning models into the devices running the ANDROID® operating system. Thus model translation module 148 provides the ability to translate machine learning models into device or operating system-specific model for deployment to various types of devices.

Application server 150 may be a server or other type of computing resource that hosts one or more applications 151.

For example, application server 150 may host a tax preparation or other financial management application.

Application server 150 includes application data 152, which includes data created by or stored as a result of user interaction with applications hosted by application server 150.

Applications server 150 also includes application forms 154. For example, application forms 154 may be related to applications 151 (e.g., tax forms for use with a tax preparation application). Notably, application forms 154 may include digital representations of various documents or forms integrated into an application that do not necessarily exist in physical form.

Application server 150 also includes application form data 156, which may relate to application forms included in application form repository 154. For example, a user may fill out an form related to one of applications 151 and that data may be stored as application form data 156 associated with a particular type of form in application form repository 154.

Application server 150 also includes application AR templates 160, which may define structured augmented reality data, such as template overlays, that can be used to interact with physical forms in an augmented reality environment. For example, the structured augmented reality data may define the size and shape of augmented reality objects, such as AR fields and AR information elements, as well as interactive elements, such as buttons or other AR user interface elements. Further, the structured augmented reality data may define rules for the interactivity of augmented reality objects, such as when an object is visible, accessible, or the like.

In one example, an AR template may define an AR overlay that includes multiple fields associated with text boxes in a physical document. The AR template may further include explanatory data regarding each of the fields (or references to such explanatory data). The AR template may even further include rules for when the explanatory data is to be displayed, as well as rules related to when and how to express AR user interface elements, such as changing colors, transparency, shape, visibility, or interactivity of AR user interface elements. These are just some examples, and many other aspects of an AR template are possible.

AR templates may be configured based on document templates. In this way, AR fields may be positioned precisely with respect to physical documents displayed in an augmented reality environment because the document template defines all of the features in the physical document.

Figure 2A:
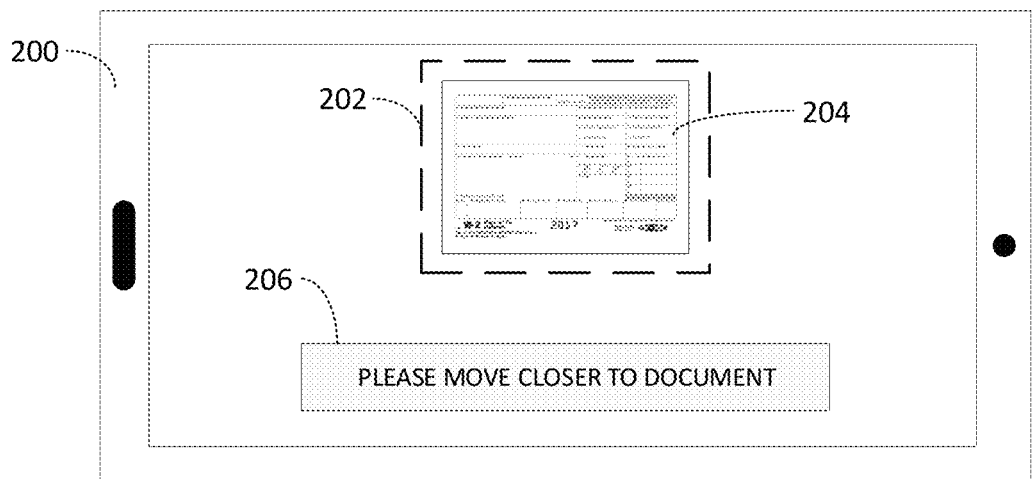
FIG. 2A depicts an example of an AR-based user interface for interacting with a physical document.

Examples of AR-Based User Interfaces for Interacting with Physical Documents FIG. 2A depicts an example of an AR-based user interface for interacting with a physical document 204.

In this example, an image of physical document 204 is displayed on a display screen of mobile device 200. Further, a document identification user interface element 206 is depicted indicating that the mobile device has detected an image of a physical document within the image data coming from its image sensor (e.g., as described with respect to mobile device 110 in FIG. 1). However, in this case a distance detection module of mobile device 200 has detected that physical document 204 is too far away to be reliably classified. In response, mobile device 200 displays an AR user interface element 206 requesting that the user move the document and mobile device closer together.

In this example, the distance detection may be based on a distance detection sensor, such as described above with respect to distance sensor 114 in FIG. 1. Alternatively, the distance detection may be based on image analysis, such as determining a relative size of the physical document in the display area.

In other examples, AR user interface element 206 may be displayed based on the clarity of the image rather than a detected distance.

Figure 2B:
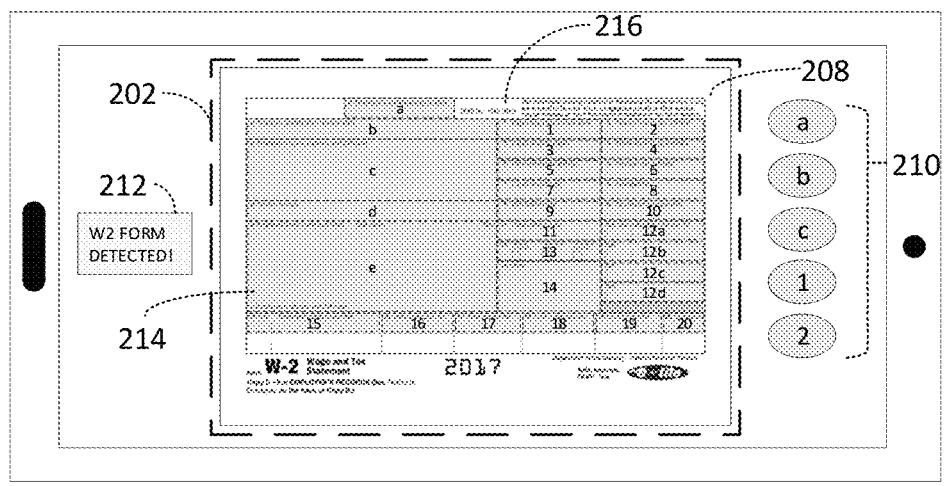
FIG. 2B depicts another example of the AR-based user interface for interacting with the physical document.

FIG. 2B depicts another example of the AR-based user interface for interacting with a physical document 204.

In this example, physical document 204 and mobile device 200 have been brought closer together (e.g., in response to AR user interface element 206 in FIG. 2A). In this case, a distance detection module may determine that the detected distance to physical document 204 is below a threshold distance, and so a document template detection may be performed (e.g., by template detection module 132 described with respect to FIG. 1).

In this example, a AR user interface element 212 indicates that a document template associated with a W2 tax form has been identified.

Once a document template is identified, an associated AR template 208 (such as described above with respect to AR templates 135 in FIG. 1) may be identified and applied to the image of the physical document 204 so as to create an augmented reality image. In some cases, AR tools (such as described above with respect to AR tools 126 in FIG. 1), may be used to size and orient the AR template so that it precisely aligns with and overlays physical document 204 on the display screen of mobile device 200 (in other words, within the augmented reality environment displayed by mobile device 200).

As depicted in FIG. 2B, AR template 208 is overlaid on physical document 204 and includes a variety of AR fields (e.g., 214), which identify specific known elements of document 204 (in this case, a specific text box area). In this example, AR template includes a colored overlay of fields defined by the template and for which the AR template can provide additional information or other interactivity. The color of various AR fields in the overlay may indicate the type of interactivity available for that field. For example, one color may indicate that the AR field may be interacted with (e.g. by a user tapping that field on a touch-sensitive display).

In this example, each of the AR fields (e.g., 214) includes a text indicator (e.g., a, b, c, d, and so on) that corresponds to an AR user interface element 210. AR user interface elements 210 may act as shortcuts so that a user may tap the AR user interface element to receive more information about the particular AR field. Such shortcuts may be useful where certain AR fields are too small for easy user interaction (e.g., AR fields 1-12*d*). Notably, in this example, only a few UI shortcuts (AR user interface elements 210) are displayed, but in other implementations, more UI shortcuts could be displayed, or more may be accessible via additional user interface navigational elements (e.g., arrows). In some implementations, the selection of AR user interface elements 210 may be based on the most frequently accessed AR template fields.

In this example, the AR fields include text indicators that match the underlying text labels (or aspects thereof). For example, the text indicators in this example match the text box labels on the physical W2 form being displayed on mobile device 200. Such text indicators may be defined in an AR template, such as AR template 208, and associated with a document template. In other examples, the text indicators may be different than the underlying text labels.

Areas of the identified document template 208 that do not include any information, or which do not include information that is "augmented" via AR template 208, are not overlain, such as area 216.

Figure 2C:
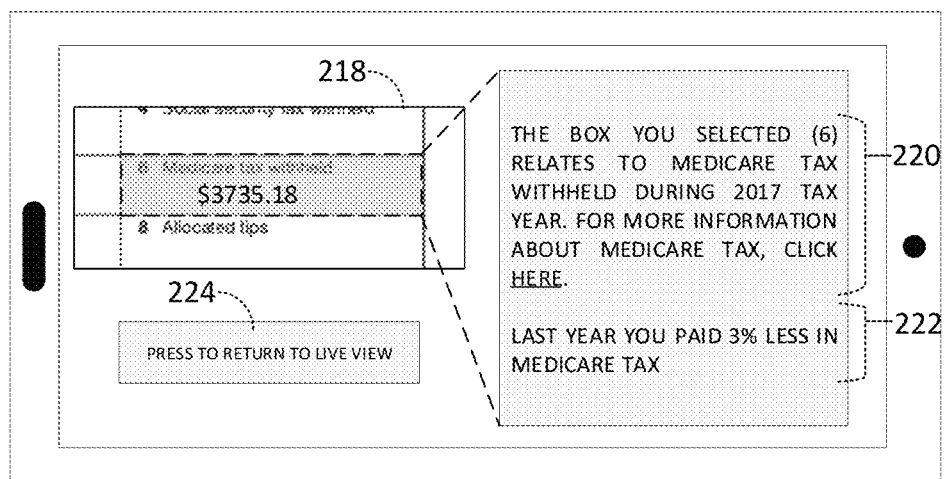
FIG. 2C depicts an example of a user interaction with an AR field defined by an AR template.

FIG. 2C depicts an example of a user interaction with an AR field defined by AR template 208. In this example, a user selected either the specific field within AR template 208 overlain on physical document 204, or a shortcut associated with that AR field, such as one of AR user interface elements 210. As a result, an inlaid image 218 of a portion of physical document 204 is displayed with the portion emphasized (here, zoomed in).

Further, an AR user interface element is displayed alongside the inlaid image 218, which includes AR information elements 220 and 222. AR information element 220 gives information about the box selected and displayed in inlaid image 218. Information element 222 gives information about the content of the selected box—in this example a comparison of the value of Medicare taxes indicated as withheld in box 6 of the W2 form as compared to the previous year's value. The previous year's value may be stored, for example, as application data and/or application form data, as discussed above with respect to FIG. 1, which is accessible to the application running on mobile device 110.

In this example, once a user has selected an AR field (here box 6), the zoomed, inlaid portion 218 is held static to avoid shakiness of the zoomed image. Thus, another AR user interface element 224 is displayed (in this examples as a button) to allow a user to go back to a live, augmented view of physical document 204.

Figure 2D:
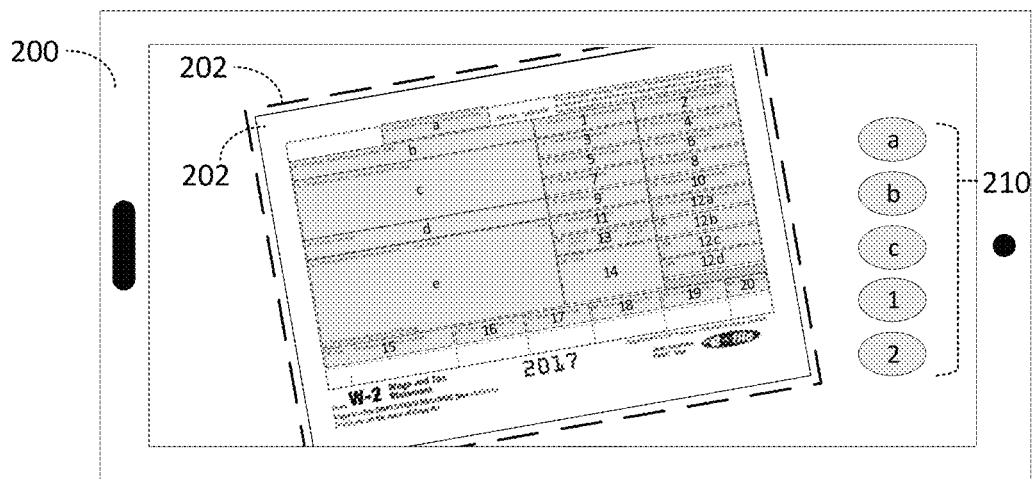
FIG. 2D depicts another view of the AR-based user interface.

FIG. 2D depicts another view of the AR-based user interface. In this example, the physical document 204 and the mobile device have been rotated relative to each other, but the AR template 208 has stayed aligned and sized appropriate to the current view of physical document 204. However, the AR user interface elements 210 have stayed in a fixed position. Thus, AR template 208 may include relative user interface aspects (such as the AR fields matched with the physical document fields) as well as static user interface elements (such as the AR interface element shortcuts).

While FIG. 2D shows translation of physical document 204 around an axis of rotation, the translation of physical document in any degree of freedom may be tracked by mobile device 200 so that AR template 208 may stay aligned with the orientation of the document. In some cases, the alignment of AR template 208 is based on a determined plane of physical document 204 in the three-dimensional (3D) augmented reality space.

Figure 2E:
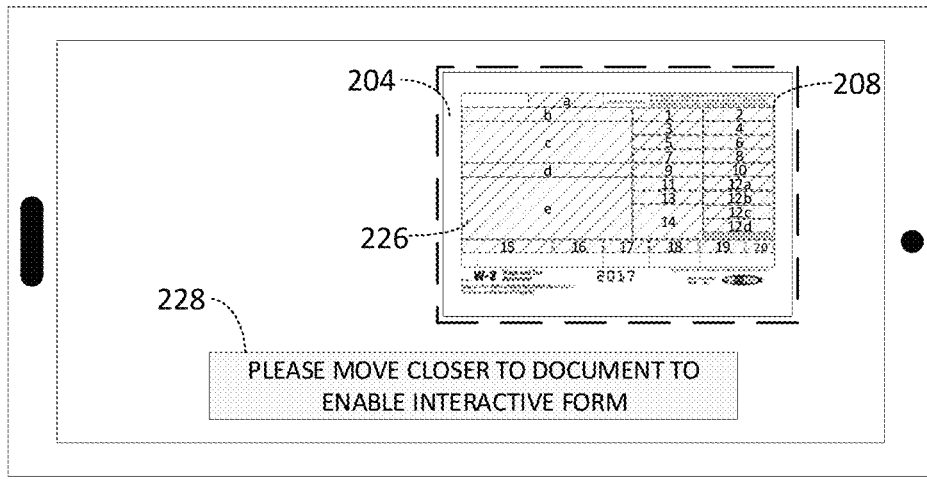
FIG. 2E depicts another view of the AR-based user interface.

FIG. 2E depicts another view of the AR-based user interface. In this example, the document template has already been determined (as described above with respect to FIG. 2B) and an AR template has already been applied to the image, but physical document 204 has been moved away from mobile device 200. Consequently, the AR fields (e.g., field 226) within AR template 208 have changed in physical appearance (shown in this example by cross-hatched lines) to indicate that the form is no longer interactive. Further, an AR information element 228 displays a message that the user should move closer to the document to enable the interactive AR fields.

Figure 2F:
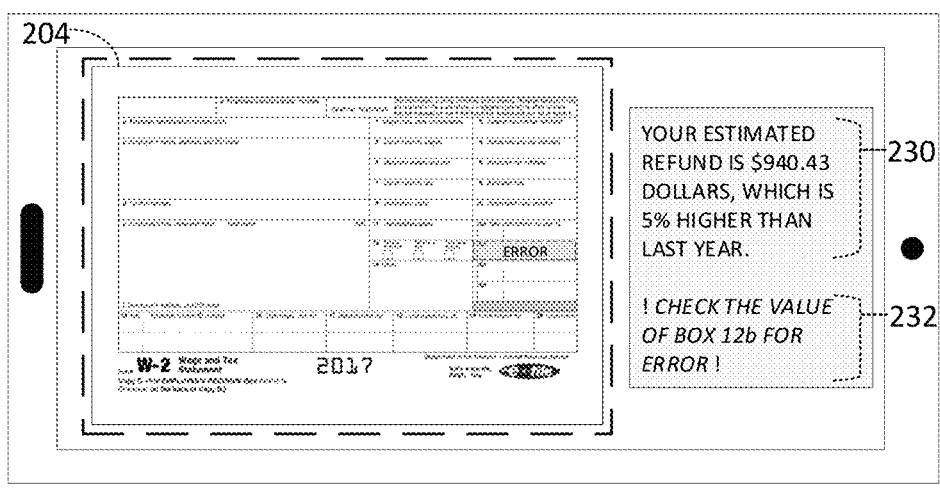
FIG. 2F depicts another view of the AR-based user interface.

FIG. 2F depicts another view of the AR-based user interface. In this example, the document template detected for physical document 204 has enabled data from physical document 204 to be gathered and used by an application either running on mobile device 200 natively, or running through, for example, a web-based application and interacting with a remote device, such as application server 150 in FIG. 1. Specifically, here AR information element 230 indicates based on the information in physical form 204 that an estimated refund is a certain value and is relatively larger or smaller (here larger) than last year's estimated refund. Thus, the results of live application functions can be displayed within the AR interface. Further, AR information element 232 indicates that a certain box within physical form may have an error. Notably, this is indicated in the AR overlay element on physical form 204 as well as in AR information element 232.

Figure 3:
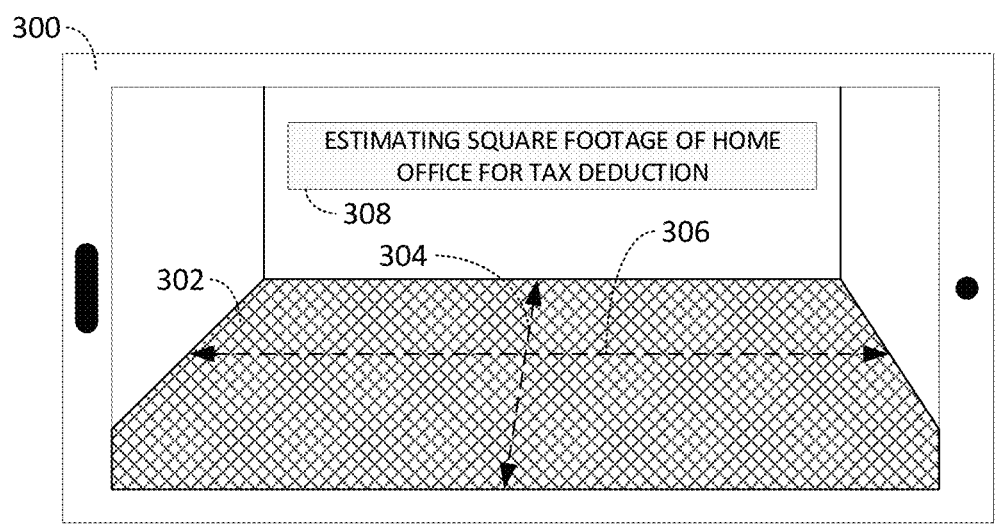
FIG. 3 depicts another example of an AR-based user interface.

FIG. 3 depicts another example of an AR-based user interface. In this example, an application is estimating square footage of a room displayed on mobile device 300 (e.g., as captured by an image sensor of mobile device 300).

For example, a tax application may need to calculate a home office deduction based on square footage. So in this example, a user uses a camera of mobile device 300 to view the image and an AR overlay indicates information about the size of the room, including a colored floor overlay 302, and length and width dimension guides 304 and 306. The distance may be based on use of distance sensors in mobile device 300, as described above with respect to FIG. 1.

Here, the AR overlay may be used to improve the accuracy of the square footage estimation by actively tracking the floor dimensions as displayed in FIG. 3.

Figure 4:
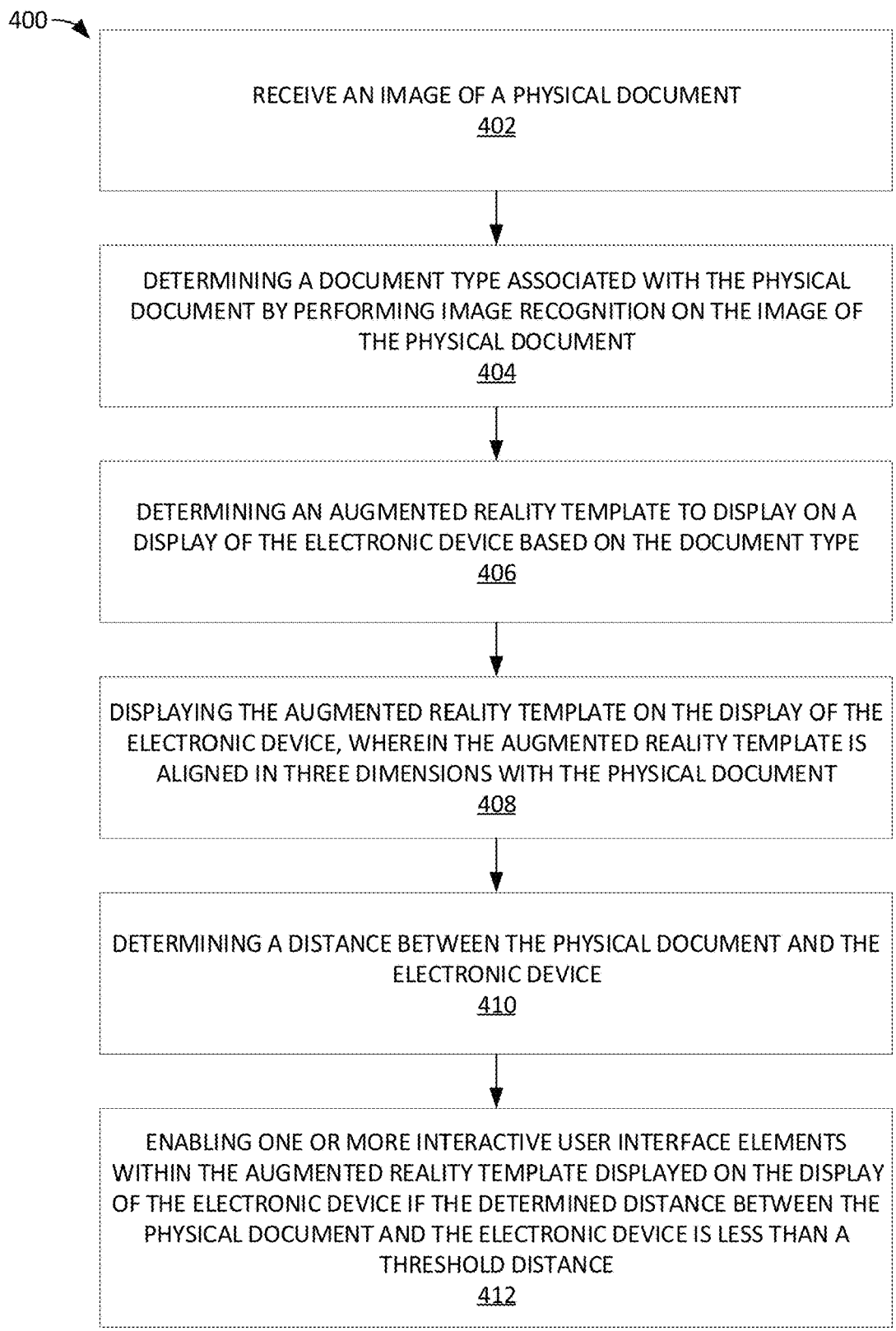
FIG. 4 depicts an example method 400 for providing an augmented reality user interface To facilitate understanding, identical reference numerals have been used, where possible, to designate identical elements that are common to the drawings. It is contemplated that elements and features of one embodiment may be beneficially incorporated in other embodiments without further recitation.

FIG. 4 depicts an example method 400 for providing an augmented reality user interface.

Method 400 starts at step 402 with receiving, by an image sensor of an electronic device, an image of a physical document. For example, a camera of a mobile device (such as described with respect to FIG. 1) may be used to capture the image of the physical document. In some examples, the electronic device is one of: a smartphone, a tablet computer, or a pair of electronic glasses.

Method 400 then proceeds to step 404 with determining a document type associated with the physical document by performing image recognition on the image of the physical document. For example, as described above, the document type may be based on an analysis of features of the physical document, such as locations of text boxes, text labels, other graphical elements, etc. In some cases, a document template is identified based on the image recognition.

In some implementations, determining a document type includes providing the image of the physical document to a machine learning model and receiving from the machine learning model a document type. For example, the machine learning model may be a classification type model, such as a regression tree or neural network (and others).

Method 400 then proceeds to step 406 with determining an augmented reality template to display on a display of the electronic device based on the document type. For example, a template associated with a W2 tax form may be determined based on the image, as described above with respect to FIGS. 2A-2B.

As described above, in some cases, a document template is identified based on the image analysis, and in such case, the augmented reality template may be based on the determined document template.

Method 400 then proceeds to step 408 with displaying the augmented reality template on the display of the electronic device, wherein the augmented reality template is aligned in three dimensions with the physical document. For example, as describe above with respect to FIG. 2D, translation of the physical document may be tracked by the device displaying the augmented reality environment so that the augmented reality template always stays aligned with the underlying document.

Method 400 then proceeds to step 410 with determining a distance between the physical document and the electronic device. For example, as described above with respect to FIG. 1, a variety of techniques using different sensors (such as image sensors and distance sensors) may be used to determine the distance between the physical document and electronic device.

Method 400 then proceeds to step 412 with enabling one or more interactive user interface elements within the augmented reality template displayed on the display of the electronic device if the determined distance between the physical document and the electronic device is less than or equal to a threshold distance, such as described above with respect to FIG. 2B.

Alternatively, one or more interactive user interface elements within the augment reality template displayed on the display of the electronic device may be deactivated if the distance between the physical document and the electronic device is greater than a threshold distance, such as described above with respect to FIG. 2E.

Though not depicted in FIG. 4, method 400 may further include receiving user input associated with at least one of the one or more interactive user interface elements within the augmented reality template and displaying an information graphic on the display of the electronic device, for example as described above with respect to FIG. 2C.

In some examples, the display of the electronic device is a touch-sensitive display, and receiving user input associated with the at least one of the one or more interactive user interface elements within the augmented reality template includes receiving touch input data from the touch-sensitive display.

Further, in some examples, receiving user input associated with the at least one of the one or more interactive user interface elements within the augmented reality template includes determining that an object within an augmented reality environment displayed on the display interacted with the at least one of the one or more interactive user interface elements. For example, a user may touch the physical document with an appendage, such as a finger, and where the user touches may correspond with an interactive AR field displayed on the display screen of the electronic device.

Though also not depicted in FIG. 4, method 400 may further include receiving a user query regarding the physical document and emphasizing at least one of the one or more interactive user interface elements within the augmented reality template displayed on the display of the electronic device based on the query.

In one example, the user asks a question, such as "which field tells me about Medicare taxes?"), which is heard by a microphone of the electronic device, parsed (e.g., using a natural language processing service), and answered by way of emphasizing an AR field associated with the user's question (e.g., the AR field overlaid on box 6 of a W2 form) and further providing an AR information element (such as shown with respect to FIG. 2C).

In another example, the user may enter a question (e.g., by typing on keyboard on the electronic device), which may likewise be parsed and answered as described above.

Notably, method 400 is just one example. In other examples, there may be more or fewer steps, or alternations to the described steps, as compared to the example described with respect to FIG. 4.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of providing an augmented reality user interface, comprising:
   receiving, by an image sensor of an electronic device, an image of a physical document;
   determining an augmented reality template to display on a display of the electronic device;
   displaying the augmented reality template on the display of the electronic device, wherein the augmented reality template is aligned in three dimensions with the physical document;
   determining a distance between the physical document and the electronic device;
   determining the distance satisfies a threshold distance;
   based on the distance between the physical document and the electronic device satisfying the threshold distance;
   performing a template detection to determine a document template for the physical document, the document template defining a location and a type of information on the physical document and defining an interactivity rule;
   defining an overlay including one or more structures aligned with the location and the type of the information on the physical document and displaying one or more interactive user interface elements;
   enabling the one or more interactive user interface elements within the augmented reality template displayed on the display of the electronic device; and
   changing a display of a particular text box of the physical document according to the interactivity rule and in response to receiving a user interaction associated by the interactivity rule with the particular text box;

determining that the distance between the physical document and the electronic device no longer satisfies the threshold distance; and based on the distance between the physical document and the electronic device no longer satisfying the threshold distance, disabling the one or more interactive user interface elements.

2. The method of claim 1, further comprising displaying an inlaid image of a particular text box of a zoomed in portion of the physical document in response to receiving a user selection of one of the one or more interactive user interface elements associated with the overlay containing the particular text box.

3. The method of claim 2, wherein:
the display of the electronic device is a touch-sensitive display, and
receiving the user selection of the one of the one or more interactive user interface elements associated with the augmented reality template comprises receiving touch input data from the touch-sensitive display.

4. The method of claim 2, wherein receiving the user selection of the one of the one or more interactive user interface elements within the augmented reality template comprises determining that a user has interacted with an object associated with an augmented reality environment displayed on the display of the electronic device.

5. The method of claim 1, wherein the electronic device is one of a smartphone, a tablet computer, or a pair of electronic glasses.

6. The method of claim 1, further comprising determining a document type associated with the physical document by performing image recognition on the image of the physical document to identify the document template based on a location of one or more graphical elements features of the physical document.

7. The method of claim 6, wherein determining the document type comprises:
providing the image of the physical document to a machine learning model; and
receiving from the machine learning model a document type.

8. A system comprising:
one or more processors; and
a memory storing instructions that, when executed by the one or more processors, cause the system to:
receive, by an image sensor of an electronic device, an image of a physical document;
determine an augmented reality template to display on a display of the electronic device;
display the augmented reality template on the display of the electronic device, wherein the augmented reality template is aligned in three dimensions with the physical document;
determine a distance between the physical document and the electronic device;
determine the distance satisfies a threshold distance;
based on the distance between the physical document and the electronic device satisfying the threshold distance;
perform a template detection to determine a document template for the physical document, the document template defining a location and a type of information on the physical document and define an interactivity rule;

define an overlay including one or more structures aligned with the location and the type of the information on the physical document and display one or more interactive user interface elements;

enable the one or more interactive user interface elements within the augmented reality template displayed on the display of the electronic device; and change a display of a particular text box of the physical document according to the interactivity rule and in response to receiving a user interaction associated by the interactivity rule with the particular text box;

determine that the distance between the physical document and the electronic device no longer satisfies the threshold distance; and based on the distance between the physical document and the electronic device no longer satisfying the threshold distance, disable the one or more interactive user interface elements.

9. The system of claim 8, wherein the instructions, when executed by the one or more processors, further cause the system to display an inlaid image of a particular text box of a zoomed in portion of the physical document in response to receiving a user selection of one of the one or more interactive user interface elements with the overlay containing the particular text box.

10. The system of claim 9, wherein:
the display of the electronic device is a touch-sensitive display, and
receiving the user selection of the one of the one or more interactive user interface elements associated with the augmented reality template comprises receiving touch input data from the touch-sensitive display.

11. The system of claim 9, wherein receiving the user selection of the one of the one or more interactive user interface elements associated with the augmented reality template comprises determining that a user has interacted with an object within an augmented reality environment displayed on the display of the electronic device.

12. The system of claim 8, wherein the electronic device is one of a smartphone, a tablet computer, or a pair of electronic glasses.

13. The system of claim 8, wherein the instructions, when executed by the one or more processors, further cause the system to determine a document type associated with the physical document by performing image recognition on the image of the physical document to identify the document template based on a location of one or more graphical elements features of the physical document.

14. The system of claim 13, wherein determining the document type comprises:
providing the image of the physical document to a machine learning model; and
receiving from the machine learning model a document type.

15. A method of providing an augmented reality user interface, comprising:
receiving, by an image sensor of an electronic device, an image of a physical document;
determining, based on a document type of the physical document, an augmented reality template to display on a display of the electronic device;
displaying the augmented reality template on the display of the electronic device, wherein the augmented reality template is aligned in three dimensions with the physical document;
determining a distance between the physical document and the electronic device based on data captured using the image sensor or a different distance sensor associated with the electronic device;

determining the distance satisfies a threshold distance;

based on the distance between the physical document and the electronic device satisfying the threshold distance;
- performing a template detection to determine a document template for the physical document, the document template defining a location and a type of information on the physical document;
- defining an overlay including one or more structures aligned with the location and the type of the information on the physical document and displaying one or more interactive user interface elements and defining an interactivity rule;
- enabling the one or more interactive user interface elements within the augmented reality template displayed on the display of the electronic device; and
- changing a display of a particular text box of the physical document according to the interactivity rule and in response to receiving a user interaction associated by the interactivity rule with the particular text box;

determining that the distance between the physical document and the electronic device no longer satisfies the threshold distance; and based on the distance between the physical document and the electronic device no longer satisfying the threshold distance, disabling the one or more interactive user interface elements.

16. The method of claim 15, further comprising displaying an inlaid image of a particular text box of a zoomed in portion of the physical document in response to receiving a user selection of one of the one or more interactive user interface elements associated with the augmented reality template.

17. The method of claim 16, wherein:
the display of the electronic device is a touch-sensitive display, and
receiving the user selection of the one of the one or more interactive user interface elements associated with the overlay containing the particular text box.

18. The method of claim 16, wherein receiving the user selection of the one of the one or more interactive user interface elements associated with the augmented reality template comprises determining that a user has interacted with an object within an augmented reality environment displayed on the display of the electronic device.

19. The method of claim 15, wherein the electronic device is one of a smartphone, a tablet computer, or a pair of electronic glasses.

20. The method of claim 15, further comprising determining a document type associated with the physical document by performing image recognition on the image of the physical document to identify the document template based on a location of one or more graphical elements features of the physical document.

* * * * *